(12) United States Patent
Doi et al.

(10) Patent No.: US 7,074,847 B2
(45) Date of Patent: Jul. 11, 2006

(54) RESIN COMPOSITION AND OPTICAL ELEMENT

(75) Inventors: Yasuhiro Doi, Tokyo-To (JP); Toshiyuki Tanimura, Yokohama (JP); Nobuaki Nakao, Yokohama (JP)

(73) Assignee: Dai Nippon Printing Co. Ltd., Tokyo-to (JP)

( * ) Notice: Subject to any disclaimer, the term of this patent is extended or adjusted under 35 U.S.C. 154(b) by 0 days.

(21) Appl. No.: 10/505,645

(22) PCT Filed: Feb. 20, 2003

(86) PCT No.: PCT/JP03/01889

§ 371 (c)(1),
(2), (4) Date: Aug. 18, 2004

(87) PCT Pub. No.: WO03/070798

PCT Pub. Date: Aug. 28, 2003

(65) Prior Publication Data

US 2005/0118430 A1    Jun. 2, 2005

(30) Foreign Application Priority Data

Feb. 20, 2002    (JP)    .......................... 2002-042902

(51) Int. Cl.
    *C08K 5/5333*    (2006.01)

(52) U.S. Cl. ...................... 524/130; 524/145; 524/442; 525/125; 428/423.1

(58) Field of Classification Search ............... 524/130, 524/145, 442; 525/125; 428/423.1
See application file for complete search history.

(56) References Cited

U.S. PATENT DOCUMENTS 5,449,709 A * 9/1995 Imae et al. ............... 524/154

(Continued)

FOREIGN PATENT DOCUMENTS

| EP | 0530141 | 3/1993 |
| EP | 0835917 | 4/1998 |
| JP | 01-163012 | * 6/1989 |
| JP | 05-117348 | 5/1993 |
| JP | 07-233227 | 9/1995 |
| JP | 08-165316 | 6/1996 |
| JP | 11-171941 | 6/1999 |
| JP | 11-240926 | 7/1999 |

OTHER PUBLICATIONS

International Search Report for PCT/JP03/01889; ISA/JP; Mailed: Jun. 3, 2003.
European Search Report for EPO Application No./Patent No. 03705371.7-2109 PCT/JP0301889 dated Oct. 5, 2005.

*Primary Examiner*—Melanie Bissett
(74) *Attorney, Agent, or Firm*—Harness, Dickey & Pierce, P.L.C.

(57) ABSTRACT

There are provided a resin composition, which has optical properties such as a high refractive index, has excellent restorability and scratch resistance, and has good adhesion to a substrate, and, when utilized as an optical member (lens) used, for example, in screens for projection televisions or the like, can satisfy various property requirements, and a cured product of the resin composition. The resin composition comprises: an epoxy (meth)acrylate oligomer having an average molecular weight of not more than 1500, a copolymer of a (meth)acrylic ester with styrene or α-methylstyrene, a thermoplastic urethane elastomer, a (meth)acrylic ester monomer, and a photopolymerization initiator.

8 Claims, 2 Drawing Sheets

U.S. PATENT DOCUMENTS

| | | |
|---|---|---|
| 6,017,603 A | 1/2000 | Tokuda et al. |
| 6,335,079 B1 | 1/2002 | Osawa et al. |
| 2002/0091174 A1* | 7/2002 | Soane et al. ................. 523/106 |
| 2003/0035917 A1* | 2/2003 | Hyman ........................ 428/67 |

* cited by examiner

RESIN COMPOSITION AND OPTICAL ELEMENT

TECHNICAL FIELD

The present invention relates to a photocurable resin composition for the formation of lenses, particularly lenses such as Fresnel lenses or lenticular lenses for use in projection televisions and the like, and an optical element comprising said resin composition.

BACKGROUND ART

Fresnel lenses have hitherto been produced by pressing, casting or the like. These methods, however, are disadvantageous in that a long time is required for lens preparation and, thus, the productivity is poor. In recent years, studies have been made on the preparation of lenses using ultraviolet-curable resin. Specifically, a lens can be produced in a short time by coating an ultraviolet-curable resin composition onto a lens-shaped mold, placing a transparent resin substrate on the resin composition coating to sandwich the resin composition coating between the transparent resin substrate and the mold, and applying ultraviolet light from the substrate side to cure the resin composition. A recent trend of projection televisions toward a reduction in thickness and an increase in size has led to the requirement that resins for lens formation have various lens characteristics such as increased refractive index and dynamic characteristics. Further, various proposals and studies have been made according to lens service environment.

A Fresnel lens for a projection screen has a construction provided by forming a lens shape using an ionizing radiation curing resin on a plastic substrate. The substrate is preferably formed of a material which is not optically anisotropic and is highly transparent. For example, polymethyl metacrylate (PMMA), a copolymer of metyl metacrylate with styrene (MS), polycarbonate (PC), and transparent olefin resins have hitherto been used as the substrate.

Further, in order to impart impact resistance to the substrate on which the shape of a lens (a cured product of an ionizing radiation-curable resin) is formed, a transparent material having a islands-sea structure formed by blending the above resin with butadiene rubber, acrylic rubber or the like is also often used.

In these plastic substrates, the selection of a proper substrate depending upon applications, properties and cost is very important. Improving the adhesion of the ultraviolet curing resin to the substrate by properly selecting the substrate is also of great significance from the practical point of view. For example, in order to improve the adhesion between the substrate and the ultraviolet curing resin, the substrate may be subjected to surface treatment (such as primer treatment, corona discharge treatment, flame treatment, ultraviolet treatment, or plasma treatment). The surface treatment effect varies depending upon the material. Further, the process and equipment for the surface treatment are also necessary. Therefore, from the viewpoint of production cost, that the lens material per se has good adhesion to the substrate is very effective. To this end, selecting a resin composition having good adhesion to the selected substrate is important from the viewpoint of shortening of a lead time on a mass production level.

In this connection, however, it should be noted that mere excellent adhesion of the ultraviolet curing resin to the substrate does not mean that properties required of the lens could have been satisfied. For example, the Fresnel lens is required to, of course, have optical properties such as refractive index and, in addition, to have vibration-damping properties, which suppress contact friction against the lenticular lens and rigidity or restorability, which can withstand the pressure of contact with the lenticular lens as disclosed in Japanese Patent Laid-Open No. 228549/2001. That is, the projection screen generally comprises two lens sheets different from each other in rigidity, i.e., a Fresnel lens and a lenticular lens. Vibration during the transportation of this screen causes friction between the two lenses, resulting in the occurrence of scratches on the surface of the lenses. In order to avoid this phenomenon, various measures have been taken such as regulation of the modulus of elasticity of the resin or interposition of a slip agent or a slip sheet. Further, silicone has been incorporated in the Fresnel lens resin to improve the friction resistance.

Lenses, formed by the photocurable resin composition, for use in projection televisions and the like are required to have properties, for example, optical properties such as high refractive index, excellent restorability and scratch resistance, and good adhesion between the substrate and the cured layer formed from the photocurable resin composition.

On the other hand, in the preparation of lenses, since a resin cured product should be released from the mold, the releasability of the resin cured product from the mold should be high.

At the present time, however, the resin compositions cannot simultaneously satisfy all the above property requirements, and provision of better resin compositions has been desired.

Accordingly, an object of the present invention is to provide a resin composition, which has optical properties such as a high refractive index, has excellent restorability and scratch resistance, and has good adhesion to a substrate, and, when utilized as an optical member (lens) used, for example, in screens for projection televisions or the like, can satisfy various property requirements, and to provide a cured product of the resin composition.

Another object of the present invention is to provide a resin composition which, even when molded into an optical member by a 2P method, does not deteriorate quality characteristics of the optical member and enables the optical member to be easily released from the mold.

DISCLOSURE OF THE INVENTION

The above object of the present invention can be attained by a resin composition comprising: an epoxy (meth)acrylate oligomer having an average molecular weight of not more than 1500, a copolymer of a (meth)acrylic ester with styrene or α-methylstyrene, a thermoplastic urethane elastomer, a (meth)acrylic ester monomer, and a photopolymerization initiator. In a preferred embodiment of the present invention, the resin composition contains polyether-modified polydimethylsiloxane as an additive.

In a more preferred embodiment of the present invention, the resin composition according to the present invention further comprises, as an internal release agent, a phosphoric ester represented by formula 1 or a phosphonic ester represented by formula 2:

$$\text{HOP}(=\text{O})(\text{OC}_n\text{H}_{2n+1})_2 \tag{1}$$

wherein n is an integer of 4 or more; and

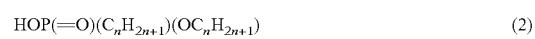

$$\text{HOP}(=\text{O})(\text{C}_n\text{H}_{2n+1})(\text{OC}_n\text{H}_{2n+1}) \tag{2}$$

wherein n is an integer of 4 or more.

Further, when the concentration of OH group in the compound contained in the resin composition according to the present invention is not less than 1.2 mmol/g, the content of the release agent is preferably 0.5 to 1.0% by weight based on the resin composition. When the concentration of urethane chain in the thermoplastic urethane elastomer contained in the resin composition is not less than 0.28 mmol/g and the concentration of OH group contained in the resin composition is 0.41 to 1.2 mmol/g, the content of the release agent is preferably 0.1 to 1.0% by weight based on the resin composition.

According to another aspect of the present invention, there is provided an optical element comprising the above resin composition. Preferably, the optical element has a refractive index of not less than 1.55 at 25° C. This optical element possesses, in addition to restorability and scratch resistance, optical properties suitable as an optical element.

According to still another aspect of the present invention, there is provided a lens-shaped molded product produced by coating the above resin composition on a mold, providing a substrate on the coating, then curing the resin composition, and separating the cured product and the substrate from the mold.

When an optical member such as a transmission type screen is formed by using a cured product of the resin composition of the present invention as a lens, the optical member has satisfactory front luminance, has optical properties such as high refractive index, has excellent restorability and scratch resistance, and has good adhesion between the substrate and the cured product.

When the phosphoric ester or phosphonic ester according to the present invention is used as a release agent, even the addition of this additive in combination with polyether-modified polydimethylsiloxane to the resin composition does not adversely affect optical properties and can impart releasability from the metallic mold and slipperiness to the cured product.

BEST MODE FOR CARRYING OUT THE INVENTION

Figure 1:
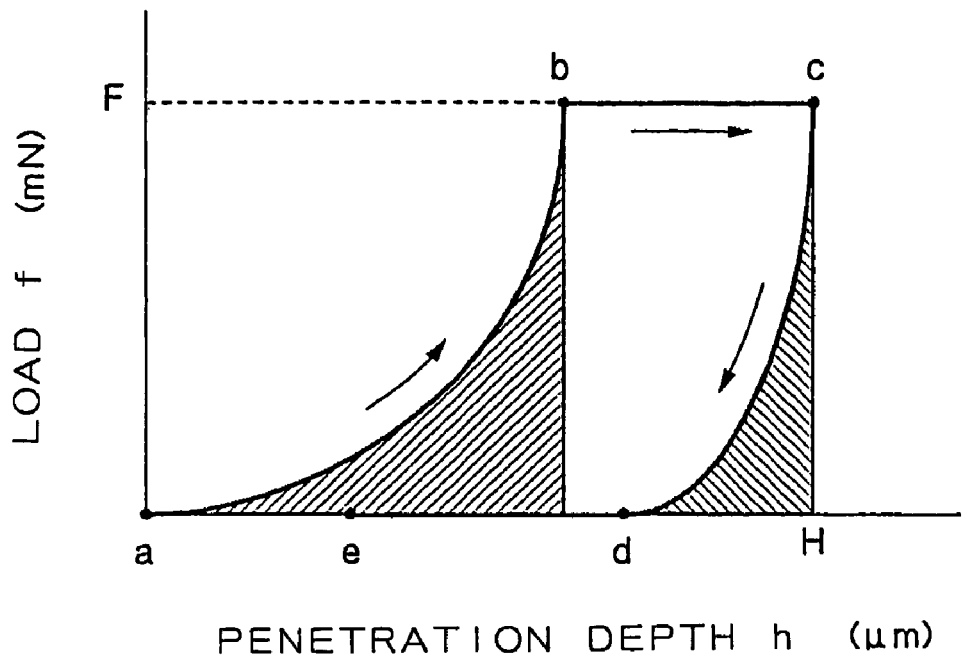
FIG. 1 is a schematic diagram illustrating a curve for dependency of penetration depth upon load.

The present invention will be described in more detail.

At the outset, the epoxy (meth)acrylate oligomer having an average molecular weight of not more than 1500 (hereinafter referred to as "component A") constituting the resin composition according to the present invention is, for example, an oligomer prepared by reacting an epoxy resin such as a bisphenol A epoxy resin, a bisphenol F epoxy resin, or a bisphenol S epoxy resin with (meth)acrylic acid.

Specific examples of component A include a structure (a) formed by reacting an epoxy resin of a monomer and/or a dimer and/or a trimer of bisphenol A, bisphenol F or bisphenol S with (meth)acrylic acid, a structure (b) formed by reacting a monomer epoxy with a dibasic acid or its anhydride and reacting the reaction product with (meth)acrylic acid, or a structure (c) formed by reacting a monomer epoxy with a dibasic acid or its anhydride and reacting the reaction product with a (meth)acrylic ester having a hydroxyl group in its molecule. The structures (a), (b), and (c) are as follows.

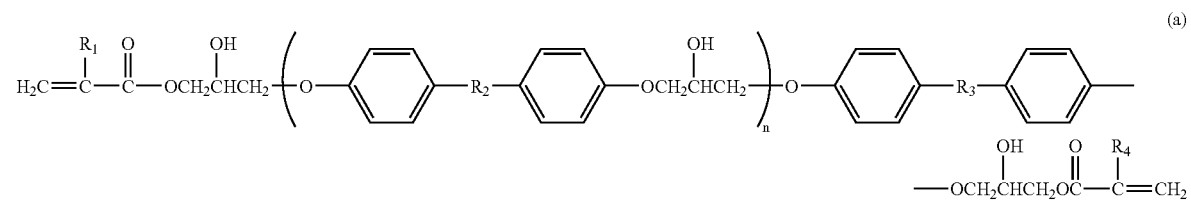

$R_1, R_4 = H, CH_3$
$R_2, R_3 = C(CH_3)_2, CH_2, S$
$n = 0-2$

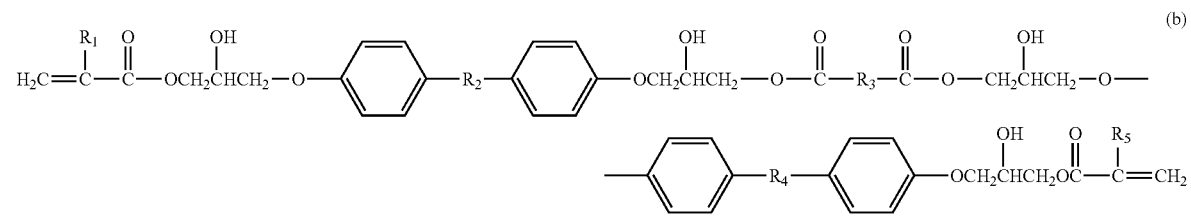

$R_1, R_5 = H, CH_3$
$R_2, R_4 = C(CH_3)_2, CH_2, S$
$R_3 =$ ⌬ , $(CH_2)_2, (CH_2)_4, (CH_2)_8$, etc.

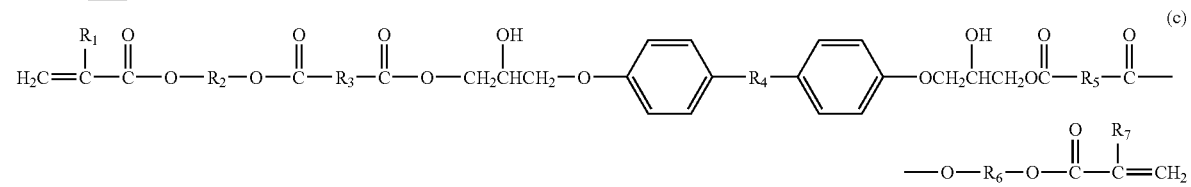

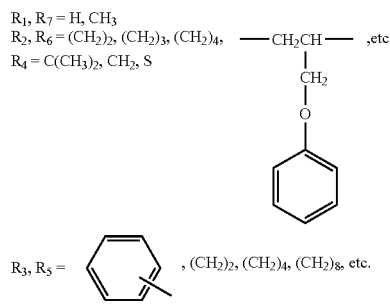

R$_1$, R$_7$ = H, CH$_3$
R$_2$, R$_6$ = (CH$_2$)$_2$, (CH$_2$)$_3$, (CH$_2$)$_4$, —CH$_2$CH—, etc
R$_4$ = C(CH$_3$)$_2$, CH$_2$, S R$_3$, R$_5$ = cyclohexyl, (CH$_2$)$_2$, (CH$_2$)$_4$, (CH$_2$)$_8$, etc.

Dibasic acids usable in structure (b) and structure (c) include phthalic acid, isophthalic acid, terephthalic acid, adipic acid, sebacic acid, succinic acid, and maleic acid. (Meth)acrylic esters usable in structure (c) include 2-hydroxyethyl (meth)acrylate, hydroxypropyl (meth)acrylate, hydroxybutyl (meth)acrylate, and 2-hydroxy-3-phenoxypropyl (meth)acrylate.

In the structure of component A, bisphenol A, bisphenol F or bisphenol S is indispensable for maintaining the high refractive index. When the average molecular weight exceeds 1500, the adhesion between the substrate and the resin composition is so poor that, in order to improve the adhesion, a considerable amount of a copolymer of (meth)acrylic ester with styrene or α-methylstyrene (hereinafter referred to as "component B") should be contained. When the average molecular weight exceeds 1500, however, the compatibility of component A with component B is deteriorated, making it impossible to homogeneously disperse components A and B in each other.

The average molecular weight of the epoxy (meth)acrylate oligomer as component A is preferably not more than 1000, most preferably about 500. The use of the epoxy (meth)acrylate oligomer having the above molecular weight can reduce the necessary content of component B which functions as an adhesion assistant and thus can solve a problem of the compatibility of component A with component B.

The lower limit of the average molecular weight of component A is about 450. When the average molecular weight of component A is lower than this value, the cured product becomes tacky or causes lowered strength properties. The term "average molecular weight" as used in this specification refers to a number average molecular weight unless otherwise specified.

The content of component A descried above in the resin composition is preferably not less than 20% by weight, particularly preferably not less than 30% by weight. The upper limit of the content of component A is about 50% by weight. When the content of component A exceeds 50% by weight, the function of components other than component A cannot satisfactorily be exhibited. On the other hand, when the content of component A is less than 20% by weight, satisfactory photocurability cannot be provided. % in the above content is by weight. In the following description, unless otherwise specified, % in the content is by weight.

The resin composition consisting of the epoxy (meth)acrylate oligomer and/or (meth)acrylic ester monomer only has unsatisfactory adhesion to the substrate. Therefore, the resin composition according to the present invention comprises a copolymer of (meth)acrylic ester with styrene or α-methylstyrene (hereinafter referred to as "component B").

Component B has a structure similar to the substrate and thus has a surface energy close to the substrate. Therefore, component B functions to improve adherence or adhesion to the substrate. The content of the copolymer based on the whole resin composition is preferably 0.1 to 20% by weight. When the content of the copolymer is less than 0.1% by weight, the adhesion to a predetermined substrate is less likely to be provided. On the other hand, when the content of the copolymer exceeds 20% by weight, the compatibility of the copolymer with component A is so poor that component A and component B are not homogeneously dispersed in each other. An (meth)acrylic resin prepared by copolymerization using styrene or α-methylstyrene as a comonomer is preferred also from the viewpoint of refractive index.

A specific example of component B is a copolymer prepared by vinyl polymerization of (meth)acrylic acid and/or an (meth)acrylic ester with styrene and/or α-methylstyrene. Specific examples of (meth)acrylic esters include methyl (meth)acrylate, ethyl (meth)acrylate, propyl (meth)acrylate, butyl (meth)acrylate, 2-ethylhexyl (meth)acrylate, hydroxyethyl (meth)acrylate, hydroxypropyl (meth)acrylate, ethoxydiethylene glycol (meth)acrylate, methoxytriethylene glycol (meth)acrylate, methoxypolyethylene glycol (meth)acrylate, methoxydipropylene glycol (meth)acrylate, tetrahydrofurfuryl (meth)acrylate, and isobornyl (meth)acrylate.

The thermoplastic urethane elastomer (hereinafter referred to as "component C") constituting the resin composition according to the present invention is added to improve friction resistance at a low temperature. When the resin composition contains component C, an islands-sea structure is formed in the film structure of the cured product to improve the impact resistance of the resin cured product. Further, component C per se and together with other component is present in an uncrosslinked state in the cured product and thus is likely to relax internal strain. Therefore, the adhesion is also improved. The content of component C based on the whole resin composition is preferably 0.1 to 10% by weight. When the content of component C is less than 0.1% by weight, the friction resistance is not improved. On the other hand, when the content of component C exceeds 10% by weight, the adhesion to the substrate is unsatisfactory.

Component C is prepared by a urethanation reaction of a diisocyanate with a diol compound. The structure of component C is not particularly limited, and any structure may be used so far as the structure is soluble in component A and component B or a polyether-modified polydimethylsiloxane described above. Preferably, component C has a molecular weight of 50,000 to 300,000 and a glass transition point temperature (Tg) of −40 to 60° C. Specifically, diisocyanates include tolylene diisocyanate, xylylene diisocyanate, isophorone diisocyanate, trimethylhexamethylene diisocyanate, and hexamethylene diisocyanate. Diol compounds include alkyidiols such as 1,4-butanediol and 1,6-hexanediol, polyetherdiols such as polyethylene glycol, polypropylene glycol, and polytetramethylene glycol, polyesterdiols comprising a dibasic acid and a diol component, and other diols such as polycaprolactone diol and polycarbonate diol. Dibasic acids usable in polyesterdiols include phthalic acid, isophthalic acid, terephthalic acid, adipic acid, sebacic acid, succinic acid, and maleic acid. Diol components usable in polyesterdiols include alkyldiols described above as the diol compounds and polyetherdiols.

Specific examples of component C include: Miractran R-22S and Miractran P-26S, manufactured by Nippon Polyurethane Industry Co., Ltd.; PANDEX T-5265H, PANDEX T-5287S, and PANDEX T-5282, manufactured by Dainippon Ink and Chemicals, Inc.; and Pellethane 2103-70A, and Pellethane 2103-80AE, manufactured by The Dow Chemical Company.

Monofunctional, difunctional, and polyfuncitonal (meth) acrylic esters and various acrylate derivatives are suitable as the (meth)acrylic ester monomer (hereinafter referred to as "component D") constituting the resin composition according to the present invention. In order to provide a refractive index of not less than 1.55, the use of phenoxyethyl acrylate derivatives (ethylene oxide and propylene oxide modified products), and bisphenol A diacrylate derivatives (ethylene oxide and propylene oxide modified products) is preferred.

Component D may be any (meth)acrylic ester which is satisfactorily compatible with component A, component B, and component C described above. Specifically, monofunctional monomers include isoamyl (meth)acrylate, hydroxyethyl (meth)acrylate, hydroxypropyl (meth)acrylate, 2-hydroxy-3-phenoxypropyl (meth)acrylate, butoxyethyl (meth) acrylate, ethoxydiethylene glycol (meth)acrylate, methoxytriethylene glycol (meth)acrylate, methoxypolyethylene glycol (meth)acrylate, methoxydipropylene glycol (meth)acrylate, phenoxyethyl (meth)acrylate, phenoxypolyethylene glycol (meth)acrylate, nonylphenol ethylene oxide adduct (meth)acrylate, tetrahydrofurfuryl (meth)acrylate, isobonyl (meth)acrylate, acryloyl morpholine, and p-cumyl phenol ethylene oxide adduct (meth)acrylate.

Bifunctional monomers include ethylene glycol di(meth) acrylate, triethylene glycol di(meth)acrylate, polyethylene glycol di(meth)acrylate, tripropylene glycol di(meth)acrylate, polypropylene glycol di(meth)acrylate, polytetramethylene glycol di(meth)acrylate, neopentyl glycol di(meth)acrylate, 1,6-hexanediol di(meth)acrylate, dimethylol trricyclodecane di(meth)acrylate, bisphenol A ethylene oxide adduct di(meth)acrylate, bisphenol A propylene oxide adduct di(meth)acrylate, and isocyanuric acid ethylene oxide adduct di(meth)acrylate.

Polyfunctional monomers include trimethylolpropane tri (meth)acrylate, ethylene oxide-modified trimethylolpropane tri(meth)acrylate, propylene oxide-modified trimethylolpropane tri(meth)acrylate, glycerin tri(meth)acrylate, pentaerythritol tri(meth)acrylate, isocyanuric acid ethylene oxide-modified tri(meth)acrylate, ditrimethylolpropane tetra (meth)acrylate, pentaerythritol tetra(meth)acrylate, and dipentaerythritol hexa(meth)acrylate.

The content of the photopolymerization initiator (hereinafter referred to as "component E") constituting the resin composition according to the present invention is preferably 0.01 to 10% by weight based on the whole resin composition. When the content of the photopolymerization initiator is less than 0.01% by weight, satisfactory photocurability cannot be provided. On the other hand, when the content of the photopolymerization initiator exceeds 10% by weight, a large amount of the photopolymerization initiator does not contribute to photocuring of the resin composition and is wasteful, leading to increased cost.

Examples of component E include 1-hydroxycylcohexyl phenyl ketone, 2-hydroxy-2-methyl-1-phenylpropan-1-one, 2,2-dimethoxy-1,2-diphenylethan-1-one, 2-benzyl-2-dimethylamino-1-(4-morpholinophenyl)-butanone-1,2-methyl-1-[4-(methylthio)phenyl]-2-morpholinopropane-1,2,4,6-trimethylbenzoyldiphenyl phosphine oxide, and phenylbis(2, 4,6-trimethylbenzoyl)-phosphine oxide.

The resin composition according to the present invention preferably contains the following additives in addition to components A to E described above. Specifically, silicone, silicone polymer, preferably modified silicone, more preferably polyether-modified polydimethylsiloxane additive may be incorporated in the resin composition. The incorporation of the above additive can improve slipperiness and, when lens sheets are formed by curing the resin composition containing the above additive, the occurrence of scratches on the surface of lenses by friction between the lens sheets can be reduced.

The content of the additive in the whole resin composition is preferably 0.01 to 10% by weight. When the additive content is less than 0.01% by weight, predetermined slipperiness cannot be provided. On the other hand, when the additive content exceeds 10% by weight, the material properties of the resin composition are deteriorated, or the adhesion between the substrate and the resin cured product is deteriorated.

Specific examples of silicones and silicone polymers usable herein include: BYK-307, BYK-333, BYK-332, BYK-331, BYK-345, BYK-348, BYK-370, and BYK-UV 3510, manufactured by Bik-Chemie Japan K.K.; X-22-2404, KF-62-7192, KF-615A, KF-618, KF-353, KF-353A, KF-96, KF-54, KF-56, KF-410, KF-412, HIVACF-4, HIVACF-5, KF-945A, KF-354, and KF-353, manufactured by The Shin-Etsu Chemical Co., Ltd.; SH-28PA, SH-29PA, SH-190, SH-510, SH-550, SH-8410, SH-8421, SYLGARD309, BY16-152, BY16-152B, and BY16-152C, manufactured by Dow Corning Toray Japan Co., Ltd.; FZ-2105, FZ-2165, FZ-2163, L-77, L-7001, L-7002, L-7604, and L-7607, manufactured by Nippon Unicar Co., Ltd.; EFKA-S018, EFKA-3033, EFKA-83, EFKA-3232, EFKA-3236, and EFKA-3239, manufactured by EFKA Additives; and GLANOL 410 manufactured by Kyoeisha Chemical Co., Ltd.

In order to avoid bleedout of the silicone component with the elapse of time upon a change in environment after curing of the resin, a reactive silicone such as silicone acrylate or silicone methacrylate may be used as an auxiliary additive in combination with the above additive. Specific examples of reactive silicones usable herein include: BYK-UV 3500 and BYK-UV 3530, manufactured by Bik-Chemie Japan K.K.; Pentad UV-31 manufactured by Dow Corning; and X-24-8201, X-22-174DX, X-22-2426, X-22-2404, X-22-164A, X-22-164B, and X-22-164C, manufactured by The Shin-Etsu Chemical Co., Ltd.

Preferably, the resin composition according to the present invention further contains a release agent represented by formula 3 or 4.

$$HOP(=O)(OC_nH_{2n+1})_2 \qquad (3)$$

wherein n is an integer of 4 or more; and $$HOP(=O)(C_nH_{2n+1})(OC_nH_{2n+1}) \qquad (4)$$

wherein n is an integer of 4 or more.

When the resin composition according to the present invention is coated onto the surface of a mold to form a coating which is then cured by ultraviolet light to prepare a lens sheet, the cured product should be separated from the mold. Since, however, the resin composition according to the present invention contains a polar group such as a hydroxyl group and a polar chain such as a urethane chain, the adhesion between the resin composition and the metallic mold is so high that the separation of the cured product from the mold is difficult. Even when the above silicone additive is contained in the resin composition, particularly in the Fresnel lens, due to its complicated shape of the lens surface, the resin enters the molding part on the surface of the mold and, consequently, the separation of the mold from the lens (cured product) becomes difficult. As described above, increasing the amount of silicone added, the releasability is improved, but on the other hand, a deterioration in material properties of the lens or a deterioration in adhesion to the substrate disadvantageously occurs.

In order to solve the above problem, Japanese Patent Publication No. 20750/1994 and Japanese Patent Laid-Open Nos. 287641/1991 and 43493/1999 disclose an alkoxyalkylphosphoric ester as a release agent for lenses. Further, Japanese Patent Laid-Open No. 57864/1996 discloses an acidic phosphonic acid derivative-type internal release agent.

As described above, however, when the resin composition contains polyether-modified polydimethylsiloxane as a slip agent, the compatibility of the polyether-modified polydimethylsiloxane with the release agent should be taken into consideration. Specifically, even when the content of the release agent and the content of the slip agent in the resin composition are low, both the silicone component and the phosphoric ester component bleed out on the interface of the mold and, in this case, in the interface of the mold, the concentration of the silicone component and the concentration of the release agent are locally increased. When the compatibility of silicone with the release agent is low, in a resin composition state (a liquid state), the resin sometimes has a clouding point, or, in a liquid state, even when the liquid is transparent, after resin curing, the surface of the molded product sometimes becomes cloudy. Further, when the compatibility of the release agent component with the silicone component is low, only releasability is developed and, consequently, the slipperiness and the transparency of the molded product cannot be improved, or conversely, even though the slipperiness is improved, the releasability is unsatisfactory, leading to unfavorable phenomena such as a change in appearance (bleedout of the silicone component) with the elapse of time.

In the present invention, when the phosphoric ester having a structure represented by formula 3 or the phosphonic ester having a structure represented by formula 4 is used as an internal release agent, a resin composition, which, even when cured, can maintain the transparency of the cured product and, at the same time, has excellent releasability, can be provided. Specifically, since these internal release agents have satisfactory compatibility with polyether-modified polydimethylsiloxane as the additive, after curing of the resin, even when the release agent and the additive bleed out on the surface of the cured product, the surface of the cured product (molded product) does not become cloudy.

When a lens sheet is prepared by curing and molding a resin compound containing the release agent having a structure represented by formula 3 or 4 according to the present invention, the lens sheet, even when stored in a high-temperature and high-humidity environment for a long period of time, does not undergo a change in appearance and is highly stable over time.

The release agent according to the present invention has a structure containing one OH group, that is, a phosphoric diester or phosphonic monoester structure. In an OH group-free phosphoric triester, the compatibility of this release agent with the polyether-modified polydimethylsiloxane is high, but on the other hand, the releasability is not satisfactory. On the other hand, a phosphoric monoester containing two OH groups is advantageous from the viewpoint of the transparency or slipperiness of the resin cured product (lens sheet). This release agent, however, has low compatibility with the polyether-modified polydimethylsiloxane, and, thus, the above-described releasability problem occurs.

In the phosphoric ester and the phosphonic ester as the release agent according to the present invention, the number of carbon atoms in the ester part is 4 or more. When the number of carbon atoms is less than 4, satisfactory releasability cannot be provided. The number of carbon atoms is preferably 8 or more.

In a preferred embodiment of the present invention, the content of the release agent in the present invention is preferably in the range of 0.05 to 5.0% by weight, more preferably 0.1 to 1.0% by weight, based on the resin composition. When the release agent content is less than 0.05% by weight, the releasability is not satisfactory. On the other hand, when the release agent content exceeds 5.0% by weight, the material properties of the molded product is deteriorated.

When the concentration of OH group of the compound contained in the resin composition is not less than 1.2 mmol/g, the content of the release agent is preferably 0.5 to 1.0% by weight based on the resin composition. When the concentration of urethane chain in the thermoplastic urethane elastomer contained in the resin composition is not less than 0.28 mmol/g and the concentration of OH group contained in the resin composition is 0.41 to 1.2 mmol/g, the content of the release agent is preferably 0.1 to 1.0% by weight based on the resin composition. The term "concentration of OH group" refers to the proportion of OH group in a bisphenol A epoxy acrylate oligomer or a hydroxy monomer such as hydroxyethyl (meth)acrylate, hydroxypropyl (meth)acrylate, or 2-hydroxy-3-phenoxypropyl (meth)acrylate among the above compounds constituting the composition in the whole resin composition. The term "concentration of urethane chain" refers to the proportion of urethane bond contained in the above thermoplastic urethane elastomer in the whole resin composition.

In the resin composition according to the present invention, the presence of a hydroxyl group and a urethane chain (urethane chain-containing general materials such as thermoplastic urethane polymers and urethane acrylate oligomers) in the resin composition is a main cause of the deterioration in releasability from a metallic mold. When the concentration of OH group is lower than 1.2 mmol/g, the presence of the release agent in the resin composition is preferred from the viewpoint of releasability from the mold. For practical purposes, however, a release agent content of less than 0.5% by weight poses no problem. The release agent content is preferably 0.1 to 0.5% by weight. In the case of resin molding not using any metallic mold, the use of the release agent is not required. In this case, a coating resin having a large difference in surface energy from that of the resin used in a nonmetallic mold may be used. Further, even when the surface energy difference is small, a fluorine additive or a silicone additive may be added, or alternatively a material containing a fluorine atom or a silicon atom may be used as the resin composition.

When the concentration of OH group is not less than 1.2 mmol/g, the adhesion of the resin composition to the metal is increased. Consequently, the molded product cannot be separated from the mold. Even when the molded product is separated from the mold in an early stage of molding, as the number of times of molding increases to several times to several tens of times, the resin begins to stay on the mold and the residual resin further deteriorates the releasability. In the present invention, the problem of the releasability can be solved by incorporating 0.5 to 1.0% by weight, based on the resin composition, of the release agent represented by formula 3 or 4. When the content of the release agent is less than 0.5% by weight, the releasability cannot be improved. On the other hand, when the content of the release agent exceeds 1.0% by weight, due to the presence of phosphoric acid or the like, the ester structure of polyester urethane polymer or the like is unfavorably hydrolyzed, leading to lowered viscosity as a result of a lowering in molecular weight which in turn deteriorates the moldability of the resin.

When a nonmetallic resin mold is used as a lens mold, the phosphoric ester release agent may not be contained in the resin composition. When the resin mold contains metallic fine particles, metallic elements or the like, preferably, as with the case of the metallic mold, the above release agent is contained in the resin composition. Even when the nonmetallic mold is used, good releasability can be realized by minimizing surface energy of any one of the mold or the resin composition to maximize the difference in surface energy between the resin composition and the mold. Specifically, for some relationship between the surface energy of the resin composition for lens molding and the surface energy of the mold, the releasability from the mold can be improved by adding a silicon-type slip agent or a fluorine-type additive to the resin composition or by blending a silicon-type or fluorine-type additive with the resin composition.

From the viewpoint of refractive index, the introduction of an aromatic compound rather than the use of an alkyl chain in the ester part is preferred because the refractive index can be enhanced. Since, however, the introduction of the aromatic compound increases the freezing point temperature of the phosphoric ester and the phosphonic ester per se, this method is unfavorable from the viewpoints of storage stability of the resin composition liquid at a low temperature and stability of the molded product stored at a low temperature. Further, in such a state that the release agent has been compatibilized with the polyether-modified polydimethylsiloxane to some extent, the slipperiness is deteriorated under low temperature environment because, in the solidification of the release agent, the silicone component is also solidified, although this phenomenon depends upon the compatibility with the polyether-modified polydimethylsiloxane. In the present invention, the freezing point temperature of the phosphoric ester and the phosphonic ester is preferably about −50° C. or below, more preferably −30° C. or below, although the preferred freezing point temperature varies depending upon service conditions.

If necessary, the resin composition according to the present invention may contain plasticizers, leveling agents, antifoaming agents, thermal polymerization inhibitors, antioxidants, photostabilizers, solvents and the like.

The resin composition according to the present invention can generally be prepared as a liquid composition by mixing and dissolving components A to E described above and optional other components. The viscosity of the liquid composition is preferably about 500 to 10,000 cps (25° C.).

The optical element according to the present invention can be prepared by a conventional method. Specifically, an optical element can be prepared by applying ultraviolet light to the above liquid resin composition, in such a state that the components have been homogeneously dispersed on such a level as homogeneously emulsified without concentration gradient, to cure the resin composition. The homogeneous dispersion of the components can provide an optical element having a high refractive index. For example, the refractive index is preferably not less than 1.55 (25° C.). In this case, a lens having high-refractive index optical properties can be prepared using the optical element. The optical element using the resin composition according to the present invention is not always required to have high transparency, so far as it has been prepared by curing the resin composition, in such a state that the components have been homogeneously dispersed, and has light transmittance on a given or higher level. Further, the optical element using the resin composition according to the present invention may have light diffusibility.

The optical element according to the present invention has been prepared by forming, on a transparent resin substrate, a cured product layer, in a lens form, of the resin composition of the present invention. The thickness of the cured product layer is preferably about 10 to 300 μm. Materials for the transparent resin substrate include, for example, polycarbonate resins, polystyrene resins, polyester resins, polyacrylic resins, or mixtures of these resins. Methods for improving the adherence (adhesion) between the transparent resin substrate and the cured product layer of the resin composition are divided roughly into 5 types, i.e., cleaning treatment, polishing treatment, chemical treatment 1 (treatment in which the surface of the substrate is oxidized and etched to improve the affinity for the composition), active gas treatment, and chemical treatment 2 (treatment in which a compound having affinity for both adhesive and adherend is coated; primer treatment). Among these treatments, the cleaning treatment, the polishing treatment, and the chemical treatment 1 disadvantageously attack the substrate per se, and, thus, it is difficult to maintain the smoothness of the lens surface. Further, the material properties of the substrate per se are possibly influenced. For this reason, these three treatments cannot be utilized without difficulties.

In the case of a member for an optical element, active gas treatment and chemical treatment 2 may be mentioned as the treatment method. For the active gas treatment, the treatment capacity varies depending upon the type of the adhesive and the adherend. Therefore, the versatility is low. Further, immediately after the treatment, bonding should be carried out, because the treatment effect is sometimes lost. Therefore, the production process is sometimes restricted. On the other hand, chemical treatment 2 suffers from increased production cost and problems of handling such as deposition of refuse and thus cannot be applied to every production process. Further, it should be noted that, although chemical treatment 2 has bonding effect, a compound which has affinity for both the substrate and the resin composition of ultraviolet curing type or the like should be selected in the production process. This is troublesome, and it is difficult to overcome the above problems.

In the resin composition according to the present invention, good adhesion between a substrate and a cured product layer can be realized, without the above special treatment, simply by coating the resin composition directly onto the substrate and curing the coating to form a cured layer. The adhesion of the resin composition according to the present invention to styrene resin substrates having excellent moistureproof properties (specifically, for example, SX 100 manufactured by Asahi Kasei Corporation, TH 21 manufactured by Denki Kagaku Kogyo K.K., CLEAPACT T1300 manufactured by Dainippon Ink and Chemicals, Inc., and ESTYRENE MS-600 manufactured by Nippon Steel Chemical Co., Ltd) is better than the adhesion particularly to PMMA (polymethyl methacrylate) substrates and PC (polycarbonate) substrates.

The lens-shaped molded product according to the present invention may be produced, for example, by coating the resin composition according to the present invention onto a Fresnel lens-shaped mold to form a coating, providing a transparent resin substrate on the coating, and then applying, in this state, an ionizing radiation such as ultraviolet light from a high pressure mercury lamp or the like to the coating from the transparent resin substrate side to cure the resin composition, and then separating the substrate and the cured product from the mold. Thus, for example, a Fresnel lens formed of the cured product having a refractive index of not less than 1.55 (25° C.) can generally be produced.

The resin composition according to the present invention is a photocurable ionizing radiation curing-type resin composition. Ionizing radiations usable herein include electromagnetic waves such as visible light, ultraviolet light and X rays, and charged particle beams such as electron beams. Among them, visible light, ultraviolet light, and electron beams are suitable from the practical point of view. In particular, when visible light or ultraviolet light is used, a photopolymerization initiator, which dissociates upon exposure to ultraviolet light or visible light with wavelengths of 1000 to 8000 angstroms to generate radicals, should be used.

When the cured product of the resin composition according to the present invention is used as a member for an optical element, material properties such as compression modulus of elasticity, creep deformation rate and anticollapse properties, friction resistance at low temperatures, storage modulus, loss tangent, and coefficient of dynamic friction are an important index. At the present time, a mainly adopted projection screen has a structure comprising two types of lenses, i.e., a lenticular lens and a Fresnel lens. This set of lenses is constructed so that the curved (arched) lens on the light incident surface side of the lenticular lens is in contact with the triangular (wedge) lens of the Fresnel lens. Due to this construction, pressure is likely to be applied to a portion between both the lenses, and particularly the shape of the front end part of the lens is likely to be deformed. The reason why such contact pressure is developed is considered as follows. Specifically, separation of the two lenses has an adverse effect on projected images. To prevent the separation of the two lenses, a warped shape is provided in the lenticular lens. In the preparation of the projection screen, this warped lenticular lens is pressed against the counter lens, i.e., Fresnel lens, and, hence, pressure is naturally developed at the portion where the two lenses are in contace with each other. Therefore, the resin for Fresnel lens formation should have material properties on a level high enough to withstand this pressure.

To this end, not only hardness but also countervailing power (creep properties) against the pressure applied to the portion between both the lenses for a long period of time should be taken into consideration. The resin can be evaluated by compression modulus of elasticity and creep deformation rate which can be measured with a microhardness meter.

In the lens sheet comprising the two lenses, the surface of the Fresnel lens, which is one of the lenses, is in such a form that wedges are continuously arranged, while the surface of the other lens, i.e., the lenticular lens, is in such a form that arches are continuously arranged. Due to these shapes of the two lenses, when the two lenses are put on top of each other, the wedge part comes into contact with the arch part. When a combination of these two lenses is transported, upon exposure to vibration during transportation, the two lenses different from each other in rigidity exhibit different behaviors. Therefore, friction or impact causes deformation or breaking of the tip part (front end part of wedge) of the Fresnel lens, or production of white powder due to shaving of the lens surface.

Further, in the above Fresnel lens, since the resin constituting the lens part generally has a high modulus of elasticity, friction resistance upon a temperature change should be imparted. To this end, a resin material for a screen having such material properties that do not cause lens deformation under various screen service environments, that is, even at high temperatures, and, at the same time, do not cause friction even at low temperatures (0° C.) or very low temperatures (−20° C.), is desired.

To satisfy these property requirements, in a dynamic viscoelasticity test, the storage modulus (hardness) should be not more than a predetermined value, and amplitude level in a resonant frequency region should be decreased. In other words, the larger the loss tangent (tan δ) as the index of the conversion of vibration energy to thermal energy, the better the vibration damping and the lower the level of friction. Further, slip properties which are effective for shear should also be imparted.

EXAMPLES

A base plate of a rubber modified styrene resin (MBS resin), in which dispersed particles had been incorporated for imparting impact resistance to styrene resin having moistureproof properties, was used as a substrate. Data on formulations of resin compositions, viscosity of the resin compositions, the adhesion of the resin compositions to the substrate, and transparency of the resin compositions are shown in Table 1 below.

TABLE 1

| | A | B | C | D | E | F | G | H | I | J |
|---|---|---|---|---|---|---|---|---|---|---|
| Bisphenol A epoxy acrylate (average molecular weight 484) | 21 | 21 | — | — | — | — | 32.65 | — | — | — |
| Bisphenol A epoxy acrylate (average molecular weight 600) | — | — | 21 | — | — | — | — | — | — | — |
| Bisphenol A epoxy acrylate (average molecular weight 1000) | — | — | — | 21 | — | — | — | 32.65 | — | — |

TABLE 1-continued

|  | A | B | C | D | E | F | G | H | I | J |
|---|---|---|---|---|---|---|---|---|---|---|
| Bisphenol A epoxy acrylate (average molecular weight 1500) | — | — | — | — | 21 | — | — | — | 32.65 | — |
| Bisphenol A epoxy acrylate (average molecular weight 2000) | — | — | — | — | — | 21 | — | — | — | 32.65 |
| Phenoxyethyl acrylate | 62.73 | 62.73 | 62.73 | 62.73 | 62.73 | 62.73 | 29.81 | 28.45 | 28.45 | 28.45 |
| Bisphenol A diacrylate (modified with PO) | — | — | — | — | — | — | 20.06 | 20.06 | 20.06 | 20.06 |
| Bisphenol A diacrylate (modified with EO) | — | — | — | — | — | — | 11.19 | 11.19 | 11.19 | 11.19 |
| Ethylene glycol dimethacrylate | 9.23 | 9.23 | 9.23 | 9.23 | 9.23 | 9.23 | — | — | — | — |
| Styrene-acryl resin | 0.81 | — | — | — | — | — | 2 | 3.36 | 3.36 | 3.36 |
| MDI urethane elastomer | 5.54 | 5.54 | 5.54 | 5.54 | 5.54 | 5.54 | — | — | — | — |
| 1-Hydroxycyclohexyl phenyl ketone | 0.92 | 0.92 | 0.92 | 0.92 | 0.92 | 0.92 | 0.93 | 0.93 | 0.93 | 0.93 |
| 2,4,6-Trimethylphenylacyl phosphine oxide | 0.09 | 0.09 | 0.09 | 0.09 | 0.09 | 0.09 | 0.09 | 0.09 | 0.09 | 0.09 |
| Viscosity (mPa · s/40° C.) | 600 | 220 | 170 | 400 | 880 | 1250 | 154 | 1600 | 2670 | — |
| MBS adhesion (JIS K 5400; 1 mm crosscut) | 100/100 | 95/100 | 90/100 | 50/100 | 20/100 | 0/100 | 100/100 | 100/100 | 100/100 | 50/100 |
| Rating specified in JIS K 5400 [best mark 10] | 10 | 8 | 6 | 2 | 0 | 0 | 10 | 10 | 10 | 2 |
| Transparency | ○ | ○ | ○ | ○ | ○ | ○ | ○ | ○ | NG | NG |

The viscosity of the resin compositions was measured based on the Brookfield type viscometer method specified in JIS K 5400. In this measurement, a BL type viscometer (rotor number: 3) manufactured by Tokyo Keiki Co., Ltd. was used, and the indicated value of the viscometer was measured one min after the start of rotation under conditions of 40° C. and 12 rpm. A value obtained by multiplying the measured indicated value of the viscometer by a conversion multiplier (100 for this condition) was regarded as the viscosity.

The adhesion between the substrate formed of MBS resin and the resin composition was evaluated as follows. Each resin composition shown in Table 1 was coated onto the surface of a mold for Fresnel lens formation by a predetermined method. The MBS resin substrate was provided on the coating to sandwich the resin composition between the mold and the substrate, and the substrate was pressed so that the coating thickness was made uniform. Ultraviolet light was then applied from the substrate side to cure the resin composition, thereby forming a cured layer. Thereafter, the cured layer and the substrate (which constitute sheet-like lens) are separated from the mold to prepare a sheet-like lens. (In this connection, it should be noted that, in curing the resin compositions, for all the resin compositions, a photoinitiator was added in an identical amount under identical conditions, although this is not described in each composition indicated in Table 1.)

In order to evaluate the adhesion between the resin composition (cured layer) and the MBS resin substrate from the separation surface side of the sheet-like lens prepared above, a cross-cut peeling test was carried out according to JIS K 5400.

When 100% (all) of the cross-cuts was in the adhered state, the adhesion score was 10; when 80% of the cross-cuts was in the adhered state, the adhesion score was 8; when 60% of the cross-cuts was in the adhered state, the adhesion score was 6; when 20% of the cross-cuts was in the adhered state, the adhesion score was 2; and when 0% of the cross-cuts was in the adhered state, that is, when none of the cross-cuts was in the adhered state, the adhesion score was 0. The transparency of the resins was evaluated by visually observing the resin compositions. When the resin composition was transparent and was not cloudy, the transparency was evaluated as "○," while, when the resin composition was cloudy, the transparency was evaluated as "NG." In this connection, it should be noted that the ink resin composition having a higher transparency does not always provide better results. From the viewpoint of light diffusibility, when the resin composition is cloudy (that is, has high haze), a light transmittance on a given or higher level suffices for contemplated purposes. Since the mixed state and the refractive index difference of the resin composition should be regulated, design can be made easier in the case of a transparent resin composition than a nontransparent resin composition. For this reason, the cloudy resin composition was evaluated as "NG."

In compositions B to F of Table 1, it is apparent that, when the average molecular weight of bisphenol A epoxy acrylate as an epoxy (meth)acrylate oligomer is in the range of 484 to 2000, if all the ingredients except for bisphenol A epoxy acrylate are identical, then the adherence (adhesion) between the resin composition (cured product) and the MBS resin substrate decreases with increasing the average molecular weight.

From a comparison of composition A with composition B, it is apparent that the adhesion to the MBS resin substrate varies depending upon whether the copolymer of an acrylic ester with styrene or α-methylstyrene (component B) is present or absent (the other ingredients are identical), and, when component B is absent, the adhesion between the resin composition (cured product) and the MBS resin substrate is low. Further, as shown in compositions G to J in Table 1, in the resin compositions having a molecular weight of 1500 and a molecular weight of 2000, as the average molecular weight of bisphenol A epoxy acrylate as the epoxy (meth) acrylate oligomer increases, the transparency of the resin composition lowers and becomes cloudy.

Examples 1 to 4 and Comparative Examples 1 to 9

Next, a base plate of a rubber-modified styrene resin (MBS resin) prepared by imparting impact resistance to a styrene resin having moistureproof properties was provided as a substrate. Resin compositions were prepared according to respective formulations. The resin compositions were measured for the adhesion between the substrate and each of the resin compositions, the refractive index of a cured product comprising each of the resin compositions, the viscosity of each of the resin compositions, and the cured products of the resin compositions were measured for storage modulus at indicated temperatures, the loss tangent at indicated temperatures, the equilibrium modulus of elasticity or coefficient of dynamic friction, the compression modulus of elasticity, the creep deformation rate, and the maximum deformation rate at the time of the creep test. The results are shown in Table 2 below.

The results of the vibration test and the anti-collapse test at indicated temperatures are also shown in Table 2.

TABLE 2

| | | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|---|
| Oligomer | Bisphenol A epoxy acrylate (average molecular weight 500) | 30.55 | 27.51 | — | — | — | — | — |
| | Bisphenol A epoxy acrylate (average molecular weight 1000) | — | 4.77 | 33.77 | 33.77 | 32.21 | 32.64 | 32.5 |
| | Bisphenol A epoxy acrylate (average molecular weight 2000) | — | — | — | — | — | — | — |
| Monofunctional monomer | Phenoxyethyl acrylate | 32.06 | 23.81 | 23.4 | 23.4 | 25.25 | 30.29 | 30.16 |
| | 2-Hydroxy-3-phenoxypropyl acrylate | — | — | — | — | — | — | — |
| | Nonylphenol acrylate | — | 9.17 | — | — | — | — | — |
| Bifunctional monomer | Bisphenol A diacrylate | 26.78 | 25.22 | 35.19 | 34.31 | 32.72 | 26.91 | 26.8 |
| | Ethylene glycol dimethacrylate | — | — | — | — | — | — | — |
| Polyfunctional monomer | Trimethylolpropane triacrylate | 2.25 | — | 1.76 | 2.64 | 2.52 | 2.6 | 2.59 |
| | Dipentaerythritol hexaacrylate | — | 2.29 | — | — | — | — | — |
| Polymer | Styrene-acryl resin | 1.81 | 2.29 | 2.64 | 2.64 | 3.78 | 3.91 | 3.89 |
| | Acrylic resin | | | | | | | |
| | Thermoplastic urethane elastomer | 2.79 | 2.75 | | | | | |
| Photoinitiator | Irgacure 184 | 1.89 | 1.01 | 0.97 | 0.97 | 0.92 | 0.96 | 0.95 |
| Silicone | Polyether-modified polydimethylsiloxane | 0.9 | 0.46 | 1.76 | 1.76 | 2.1 | 2.17 | 2.59 |
| Adhesion (JIS K 5400) | | 100/100 | 100/100 | Δ | Δ | 100/100 | 100/100 | 100/100 |
| Refractive index (D line) at 25° C. | | 1.552 | 1.552 | 1.553 | 1.552 | 1.553 | 1.553 | 1.553 |
| Viscosity (Mpa · s/40° C.) | | 1700 | 2200 | 2140 | 2010 | 2100 | 1790 | 1830 |
| Storage modulus (×10 dyne/cm$^2$) (10 Hz) at | | | | | | | | |
| 25° C. | | 1.61 | 1.15 | 2.01 | 2.10 | 2.15 | 1.78 | 1.90 |
| 0° C. | | 2.61 | 2.24 | 3.25 | 3.52 | 4.43 | 3.52 | 3.40 |
| −20° C. | | 2.82 | 2.38 | 4.53 | 4.01 | 4.92 | 3.98 | 3.86 |
| Tan δ (10 Hz) at | | | | | | | | |
| 25° C. | | 0.198 | 0.196 | 0.201 | 0.189 | 0.197 | 0.203 | 0.187 |
| 0° C. | | 0.035 | 0.027 | 0.021 | 0.03 | 0.021 | 0.037 | 0.046 |
| −20° C. | | 0.019 | 0.012 | 0.013 | 0.015 | 0.012 | 0.025 | 0.035 |
| Equilibrium modulus of elasticity (80° C.) (×10 dyne/cm$^2$) (1 Hz) | | 2.92 | 2.76 | 1.62 | 1.52 | 1.43 | 1.27 | 1.37 |
| Coefficient of dynamic friction | | 0.12 | 0.14 | 0.16 | 0.18 | 0.10 | 0.10 | 0.10 |
| Vibration test (friction resistance) PSD waveform random vibration test at | | | | | | | | |
| 25° C. (10 cycles) | | ◯ | ◯ | X | X | ◯ | ◯ | ◯ |
| 0° C. (5 cycles) | | ◯ | ◯ | X | X | X | X | X |
| −20° C. (3 cycles) | | ◯ | Δ | X | X | X | X | X |
| Compression modulus of elasticity (MPa) | | 1355 | 1190 | 1550 | 1153 | 1788 | 1501 | 1515 |
| Creep deformation rate (%) | | 19.7 | 21.7 | 38.0 | 55.3 | 17.1 | 22.25 | 34.23 |
| Collapse resistance test | | ◯ | ◯ | Δ | Δ | ◯ | ◯ | ◯ |

| | | Comp. Ex. 6 | Comp. Ex. 7 | Comp. Ex. 8 | Ex. 3 | Ex. 4 | Comp. Ex. 9 |
|---|---|---|---|---|---|---|---|
| Oligomer | Bisphenol A epoxy acrylate (average molecular weight 500) | — | — | — | — | 30.30 | — |
| | Bisphenol A epoxy acrylate (average molecular weight 1000) | 31.4 | 30.77 | 28.99 | 27.08 | — | — |
| | Bisphenol A epoxy acrylate (average molecular weight 2000) | — | — | — | — | — | 17.48 |
| Monofunctional monomer | Phenoxyethyl acrylate | 25.45 | 18.73 | 18.12 | 23.81 | 31.81 | 14.42 |
| | 2-Hydroxy-3-phenoxypropyl acrylate | — | — | — | — | — | 31.21 |
| | Nonylphenol acrylate | — | — | — | — | — | — |
| Bifunctional monomer | Bisphenol A diacrylate | 31.91 | 27.81 | 28.98 | 37.51 | 26.57 | 12.28 |
| | Ethylene glycol dimethacrylate | — | — | — | — | — | 15.26 |
| Polyfunctional monomer | Trimethylolpropane triacrylate | 2.45 | — | — | 2.74 | 2.23 | — |
| | Dipentaerythritol hexaacrylate | — | 7.36 | 4.03 | — | — | — |
| Polymer | Styrene-acryl resin | 3.68 | 3.68 | 3.63 | 3.93 | 1.79 | |
| | Acrylic resin | | | | | | 1.14 |

TABLE 2-continued

|  |  |  |  |  |  |  |  |
|---|---|---|---|---|---|---|---|
|  | Thermoplastic urethane elastomer |  |  |  | 0.93 | 2.76 | 3.42 |
| Photoinitiator | Irgacure 184 | 0.90 | 0.90 | 0.89 | 1.01 | 1.87 | 1.03 |
| Silicone | Polyether-modified polydimethylsiloxane | 2.05 | 2.05 | 2.01 | 2.29 | 1.78 | — |
| Adhesion (JIS K 5400) |  | 100/100 | 100/100 | 100/100 | Δ | 100/100 | X |
| Refractive index (D line) at 25° C. |  | 1.552 | 1.552 | 1.551 | 1.551 | 1.552 | 1.554 |
| Viscosity (Mpa · s/40° C.) |  | 1950 | 1950 | 1950 | 3020 | 1750 | 2000 |
| Storage modulus (×10 dyne/cm$^2$) (10 Hz) at |  |  |  |  |  |  |  |
| 25° C. |  | 1.96 | 1.57 | 1.54 | 1.15 | 1.00 | 1.51 |
| 0° C. |  | 3.75 | 3.19 | 3.35 | 2.77 | 2.61 | 2.85 |
| −20° C. |  | 4.08 | 3.64 | 3.90 | 3.12 | 2.82 | 3.07 |
| Tan δ (10 Hz) at |  |  |  |  |  |  |  |
| 25° C. |  | 0.213 | 0.212 | 0.219 | 0.201 | 0.242 | 0.33 |
| 0° C. |  | 0.028 | 0.036 | 0.035 | 0.031 | 0.043 | 0.058 |
| −20° C. |  | 0.013 | 0.019 | 0.012 | 0.015 | 0.021 | 0.024 |
| Equilibrium modulus of elasticity (80° C.) (×10 dyne/cm$^2$) (1 Hz) |  | 1.64 | 2.52 | 2.75 | 1.44 | 2.98 | 1.87 |
| Coefficient of dynamic friction |  | 0.10 | 0.13 | 0.12 | 0.10 | 0.10 | 0.22 |
| Vibration test (friction resistance) PSD waveform random vibration test at |  |  |  |  |  |  |  |
| 25° C. (10 cycles) |  | ○ | ○ | ○ | ○ | ○ | Δ |
| 0° C. (5 cycles) |  | X | X | X | ○ | ○ | X |
| −20° C. (3 cycles) |  | X | X | X | Δ | ○ | X |
| Compression modulus of elasticity (MPa) |  | 1661 | 1346 | 1651 | 1522 | 1405 | 1627 |
| Creep deformation rate (%) |  | 36.5 | 24.7 | 21.9 | 24.45 | 16.98 | 19.75 |
| Collapse resistance test |  | ○ | ○ | ○ | ○ | ○ | ○ |

The above evaluations and measurements were carried out by the following methods, except that the adhesion between the resin composition and the MBS resin substrate was evaluated in the same manner as indicated in Table 1.

Refractive Index

Cured sheets prepared in the same manner as in the samples for dynamic viscoelasticity measurement described below were provided as samples. Each of the samples was brought into intimate contact with an Abbe's refractometer in its prism part using 1-bromonaphthalene, and the refractive index was measured with D line (λ=589 nm) at a sample temperature of 25° C. (For others, the measurement was done according to JIS K 7105.)

Preparation of Samples for Measurement of Dynamic Viscoelasticity

Samples for the measurement of storage modulus, loss tangent, and equilibrium modulus of elasticity as dynamic viscoelasticity were prepared as follows. A stainless steel plate having a flat surface and controlled at 40 to 42° C. was provided as a mold. Each resin composition regulated to 40 to 42° C. was coated to a thickness of 200 μm onto the surface of the mold. Light was applied from a metal halide-type ultraviolet light lamp (manufactured by Japan Storage Battery Co., Ltd.) to the coating under conditions of integrated quantity of light 2000 mJ/cm$^2$ and peak illumination 250 mW/cm$^2$ to cure the resin composition. Thereafter, the cured sheet was separated. Thus, sheets for samples were prepared.

Preparation of Samples for Measurement of Compression Modulus of Elasticity

Sheets for samples in a Fresnel lens form for the measurement of compression modulus of elasticity were prepared in the same manner as in the preparation of the samples for the measurement of dynamic viscoelasticity, except that a nickel mold having a surface shape which is the reverse of the shape of a Fresnel lens was used instead of the stainless steel plate having a flat surface.

Measurement of Dynamic Viscoelasticity

The samples thus obtained were molded into strips having a size of 30 mm×3 mm×0.2 mm. 0.05% load strain was applied to the samples with a dynamic viscoelasticity measuring device ("RHEOVIBRON," manufactured by Orientec Co., Ltd.), and the storage modulus and the loss tangent were measured. In the measurement, the frequency was 1 to 10 Hz, and the temperature range was −100 to 100° C. (temperature rise rate 3° C./min). A curve for the dependency of storage modulus upon temperature and a curve for the dependency of loss tangent upon temperature were prepared using the measured data.

The storage modulus at 25° C. (room temperature), 0° C., and −20° C. was determined from the curve for the dependency of storage modulus upon temperature. Separately, a curve for the dependency of storage modulus upon temperature was prepared in the same manner as described just above, except that the frequency of force vibration was 1 Hz. The storage modulus at 80° C. was determined as an equilibrium modulus of elasticity from the curve for the dependency of storage modulus upon temperature.

Further, the loss tangent at 25° C. (room temperature), 0° C., and −20° C. was determined from the curve for the dependency of loss tangent upon temperature.

Measurement of Coefficient of Dynamic Friction

Samples for the measurement of coefficient of dynamic friction were prepared in the same manner as in the preparation of the samples for the measurement of dynamic viscoelasticity, except that the thickness of the coating was 100 μm and, in the ultraviolet irradiation, the coating was covered with an acrylic plate. In the measurement, a surface property measuring device (HEIDON TRIBOGEAR TYPE: 14DR, manufactured by Shinto Scientific Company Ltd.) was used. A vertical load (a point pressure of 100 g) was applied with a ball indenter to the surface of the samples, and the ball indenter was slid on the surface of the sample at a speed of 300 mm/min to measure the coefficient of dynamic friction. The measurement was done five times, and the average of the measured values was regarded as the coefficient of dynamic friction.

Measurement of Compression Modulus of Elasticity

A universal hardness test using an ultramicrohardness meter (H-100V, manufactured by Fischer, Germany) was applied to calculate the compression modulus of elasticity. Specifically, the load applied by an indenter was gradually increased to a predetermined value and was then gradually decreased to prepare a curve for the dependency of penetration depth upon load, and the results of the measurement were analyzed to calculate the compression modulus of elasticity. The indenter used was a tungsten carbide (WC) ball indenter having a diameter of 0.4 mm.

The curve for the dependency of penetration depth upon load is typically as shown in FIG. 1. At the outset, upon a gradual increase in load from load 0 (point a) to load f, deformation occurs, and the penetration depth of the indenter gradually increases. When increasing the load is stopped at a certain load value, penetration caused by plastic deformation is stopped (point b). Thereafter, the load value is allowed to remain unchanged, during which time the penetration depth continues to increase due to creep deformation and reaches point c which stops the retention of the load value. Thereafter, as the load is gradually decreased, the penetration depth decreases toward point d due to elastic deformation.

In this case, the maximum load value F, which is the load value at point b in FIG. 1, was set to 20 mN. The reason for this is as follows. In an actual projection screen, the pressure of contact between the Fresnel lens sheet and the lenticular lens sheet is so small that the actual measurement of the contact pressure is difficult. However, when the deformation level of the lens constituting the screen is about 10 μm on the outer peripheral part of the lens sheet which should satisfy a strict requirement, this deformation is acceptable from the viewpoint of lens performance. For this reason, since the load required for the conventional lens sheet to be deformed by 10 μm is about 20 mN, 20 mN was used as the maximum load value. The time for creep deformation was arbitrarily brought to 60 sec.

The procedure for determining the curve for the dependency of penetration depth upon load is as follows.

(1) The load value for compression is increased from 0 (zero) to 20 mN in 100 steps every 0.1 sec.

(2) The load value increased to 20 mN is maintained for 60 sec to cause creep deformation.

(3) The load value is decreased to 0.4 mN (lowest load in the tester) in 40 steps every 0.1 sec.

(4) The load value 0.4 mN is maintained for 60 sec to recover the penetration depth.

(5) The above steps (i) to (4) are repeated three times.

Figure 2:
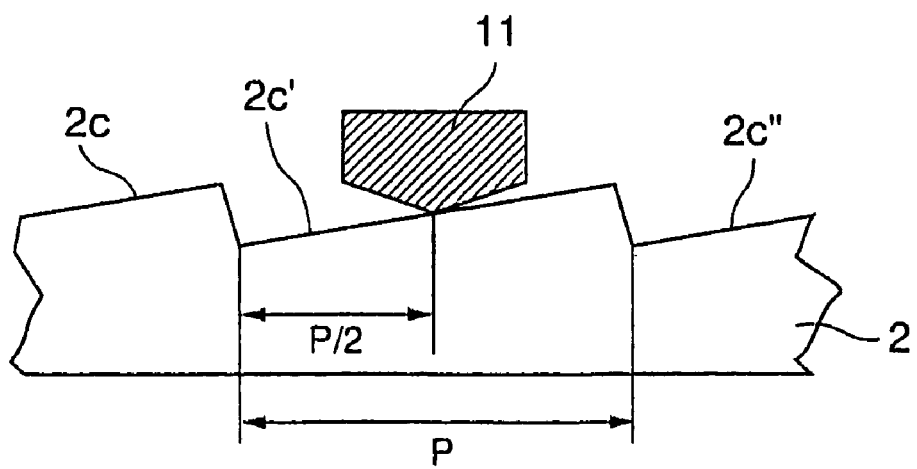
FIG. 2 is a schematic diagram showing an indenter action site.

As shown in FIG. 2, the site on which the ball indenter is allowed to act is preferably around the center part in individual segmented lens surfaces constituting the Fresnel lens, for example, the center part in parts as indicated by 2c, 2c', and 2c". When the spacing between adjacent concaves in the lens surface is pitch P, the center part is around a position corresponding to P/2. Also in the case of other lens shapes, the ball indenter is preferably allowed to act on a position around the center of individual lens surfaces constituting the lenses.

The compression modulus of elasticity (E) was determined by the following equation.

$$E=1/(2(hr(2R-hr))^{1/2} \times H \times (\Delta H/\Delta f)-(1-n)/e)$$

wherein

"hr" represents penetration depth at an intersection of a tangential line with a penetration depth axis (an abscissa) in a curve, for the dependency of penetration depth upon load, in its load reduction zone when load f is a maximum value F (unit: mm);

"R" represents the radius (2R=0.4 mm) of the ball indenter;

"H" represents the maximum value of penetration depth h (unit: mm);

"ΔH/Δf" represents the reciprocal of the slope of a curve, for the dependency of penetration depth upon load, in its load reduction zone when load f is a maximum value F;

"n" represents the Poisson's ratio of the material (WC) of the ball indenter (n=0.22); and "e" represents the modulus of elasticity of the material (WC) of the ball indenter (e=5.3×10$^5$ N/mm$^2$).

As described above, increase/decrease of load and the like were repeated three times in the order of steps (1), (2), (3), and (4). In this case, for each time of repetition, a curve for the dependency of penetration depth upon load was determined, and, based on each of the curves, the compression modulus of elasticity (E) (unit: Mpa) was determined, and the average of the values was regarded as the compression modulus of elasticity.

Creep Deformation Rate

The creep deformation rate (C) was determined by the following equation.

$$C=(h2-h1)\cdot 100/h1$$

wherein h1 represents penetration depth when the load reaches a given testing load (20 mN in this case) (point b in FIG. 1) (unit: mm); and h2 represents penetration depth after a predetermined period of time (60 sec) has elapsed while holding the testing load (point c in FIG. 1) (unit: mm).

Vibration Test

Figure 3:
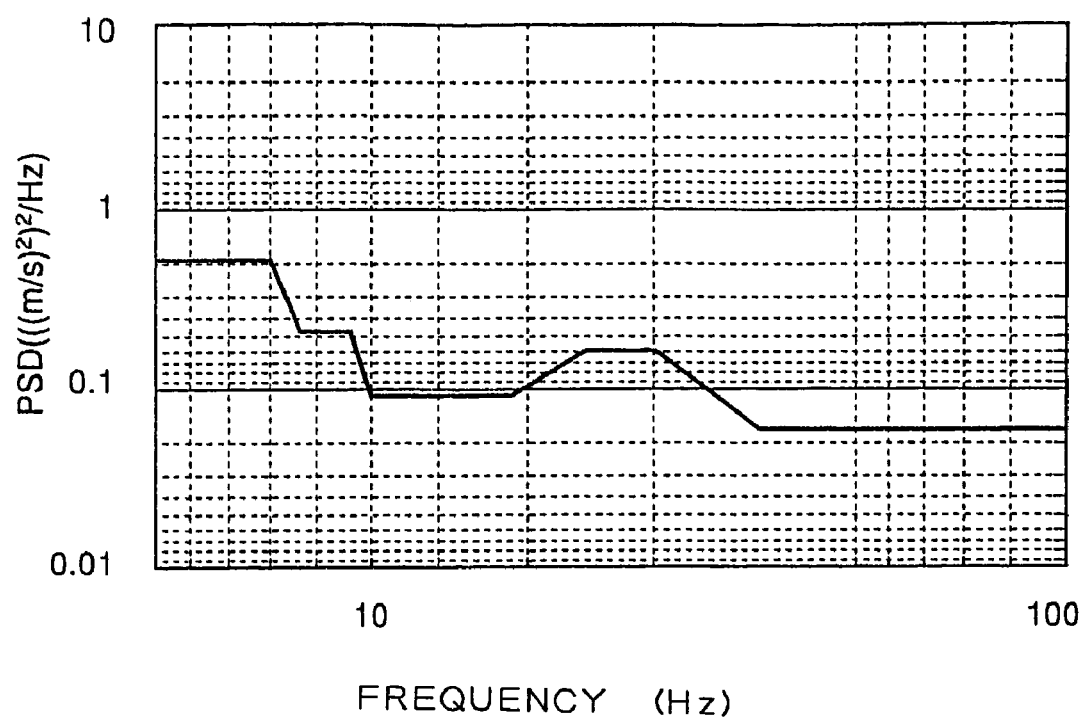
FIG. 3 is a graph showing a PSD waveform used in a vibration test.

A Fresnel lens sheet was brought into intimate contact with a lenticular lens sheet so that the lens surface in the Fresnel lens sheet faced the lens surface in the lenticular lens sheet. The four sides of the assembly were fixed by a pressure-sensitive adhesive tape, and the fixed assembly was fitted into a wood frame of TV screen size. This was set in a vibration tester (EDS 252, a vibration tester, manufactured by Akashi Corporation) installed within an environment test chamber kept at a constant temperature. Random waves having PSD (power spectrum density) waveform shown in FIG. 3 were used for vibration, and a vibration test corresponding to truck transportation of 5000 km was carried out by 10 cycles in the case of a temperature of 25° C., by 5 cycles in the case of a temperature of 0° C., and by 3 cycles in the case of a temperature of –20° C. In these cases, 1 cycle was 4320 sec.

The random wave is an indefinite wave having statistic properties which can be expressed by PSD function, and, in this vibration test, test conditions are determined using the function as an index. The reason why the random wave is used is that nonlinear elements of the vibration can be eliminated, that is, nonlinear elements by mounting of a projection screen, a packing form and the like can be eliminated, and the vibration of the object can be added under given conditions. Further, all the vibrations are different in any point of time base with the test start time being 0 (zero). Therefore, conditions which are closer to vibrations during actual transportation can be produced.

25° C. (room temperature), 0° C., and −20° C. were used as environmental temperatures. After the completion of the test, a screen of which the whole is white was projected by a projector to inspect the screen for uneven brightness. In this case, when uneven brightness attributable to friction between lenses was clearly observed, the lens sheet was evaluated as x; when uneven brightness was observed on a level that is inconspicuous, the lens sheet was evaluated as Δ; and, when uneven brightness was not observed, the lens sheet was evaluated as ○.

TV Setting Collapse Test

Fresnel lens sheets prepared by molding using the same resin compositions as those used for the measurement of the above compression modulus of elasticity (E) and the creep deformation rate (C) were placed so as to face a predetermined lenticular lens sheet, and the four sides of the assemblies were fixed by a tape, and the fixed assemblies were fitted into wood frames of individual television sizes, followed by mounting on televisions to visually observe and evaluate a white screen. After the elapse of one hr, when collapse of the Fresnel lens sheet was observed, the lens sheet was evaluated as "x," and, when collapse was not observed, the lens sheet was evaluated as "0."

From Table 2, Examples 1 to 4 provided good results for all the adhesion, friction resistance (vibration test) and anti-collapse test. In the case of Example 2, however, the coefficient of dynamic friction is large, and the friction resistance at −20° C. is somewhat poor. The reason for this is considered to reside in that, in Example 2, oligomers having a relatively low molecular weight are distributed in a large proportion in the crosslinked structure and the crosslinking density is high because of the use of a polyfunctional monomer (dipentaerythritol hexaacrylate) as a resin cured product and, consequently, tan δ of the cured product is low.

Further, the reason for the somewhat poor friction resistance at −20° C. in Example 3 is considered as follows.

Further, since bisphenol A epoxy acrylate used in Example 3 has an average molecular weight of 1000 which is the highest molecular weight in the Examples, the adhesion is inferior to that in Example 1 and the like.

Further, in the resin compositions of Comparative Examples 1 to 8, since any thermoplastic urethane elastomer (component C) is not contained, the friction resistance (vibration test) is not good. In Comparative Example 9, bisphenol A epoxy acrylate as an epoxy (meth)acrylate oligomer used has a molecular weight of 2000, and, thus, the adhesion is low. Further, since a copolymer of a (meth) acrylic ester with styrene or α-methylstyrene (component B) is not contained, the adhesion is lower.

Examples 5 to 7 and Comparative Examples 10 to 12

A sheet-like lens was prepared in the same manner as in Example 2, except that 0.7% by weight of a release agent as shown in Table 3 and additives, i.e., 0.50% by weight of a polyether-modified polydimethylsiloxane (L-7001, manufactured by Nippon Unicar Co., Ltd.) and 0.1% by weight of a fluorine leveling agent (Megafac F-470, manufactured by Dainippon Ink and Chemicals, Inc.), were added to the resin composition used in Example 2. In order to examine the compatibility of each release agent with polyether-modified polydimethylsiloxane, the state of a mixed solution composed of the release agent and polyether-modified polydimethylsiloxane in a ratio of 1:1 was visually evaluated. When the solution was transparent, the compatibility was evaluated as ○, while, when the solution was clouded or in a separated state, the compatibility was evaluated as X. Further, the fluidity of the mixed solution at −10° C. was examined. The mixed solution was placed as a sample in a glass bottle and stored at −10° C. The glass bottle containing the sample of −10° C. was inclined by 90- degrees. In this case, when the sample was immediately flowed (the sample was clearly in a liquid state), the fluidity was evaluated as ○, while, when sample is not fluid and solid or waxy, the fluidity was evaluated as X.

TABLE 3

Various properties of phosphoric esters and phosphonic esters, and compatibility of these esters with polydimethylsiloxane

| Sample | Chemical formula | Viscosity (25° C.) (mPa · s) | Freezing point (° C.) | Compatibility | Fluidity at −10° C. |
|---|---|---|---|---|---|
| Ex. 1 | $HOP(=O)(OC_8H_{17})_2$ | 35 | <−60 | ○ | ○ |
| Ex. 2 | $HOP(=O)(OC_{10}H_{21})_2$ | 84 | No data | ○ | ○ |
| Ex. 3 | $HOP(=O)(C_8H_{17})(OC_8H_{17})$ | 35 | <−50 | ○ | ○ |
| Comp. Ex. 1 | $(HO)_2P(=O)(OCH_3)$ | 146 | <−50 | X (separated with yellowing) | X |
| Comp. Ex. 2 | $O=P(OCH_3)_3$ | 2 | −70 | ○ | ○ |
| Comp. Ex. 3 | $HOP(=O)(OC_4H_9)_2$ | 41 | <−50 | X (clouded) | ○ |

Specifically, it is considered that, in the resin composition of Example 3, as compared with Example 2, bisphenol A epoxy acrylate having a higher average molecular weight (1000) is used and, since, however, the mixing ratio of the difunctional bisphenol A diacrylate is considerably high (attributable also to modified repeating units), the molecule is rigid, and the storage modulus at −20° C. is high. However, it is considered that, since a thermoplastic elastomer is contained, as compared with Comparative Example 8, the storage modulus is lower and the friction resistance is superior.

Evaluation was carried out for the releasablity of the sheet-like lens from a mold at the time of the preparation of the sheet-like lens, the transmittance of the sheet lens, and the haze value of the sheet lens. Further, the lens sheets thus obtained were subjected to an acceleration test. Specifically, the lens sheets were held under conditions of 60° C. and 95% RH for 168 hr and were then evaluated for the transmittance, haze value, and lens surface state of the lens sheets. Further, the lens sheets were subjected to a vibration test at −20° C. in the same manner as in Example 2. The results are shown in Table 4.

TABLE 4

Various properties of Fresnel lens

| Classification No. | State of Fresnel lens just after preparation | | | State of Fresnel lens after acceleration test | | | Vibration test (−20° C.) | Overall |
|---|---|---|---|---|---|---|---|---|
| | Releasability | Total light transmittance (%) | Haze value (Δ) | Total light transmittance (%) | Haze value (Δ) | Surface | | |
| Ex. 1 | ○ | 92.0 | 0.5 | 91.8 | 0.6 | ○ | ○ | ○ |
| Ex. 2 | ○ | 92.0 | 0.4 | 92.0 | 0.4 | ○ | ○ | ○ |
| Ex. 3 | ○ | 92.4 | 0.5 | 92.2 | 0.5 | ○ | ○ | ○ |
| Comp. Ex. 1 | X | 93.7 | 17.9 | 95.9 | 60.0 | Sticky | — | X |
| Comp. Ex. 2 | X | 91.7 | 0.4 | 92.0 | 0.5 | ○ | ○ | X |
| Comp. Ex. 3 | Δ | 91.9 | 0.3 | 92.1 | 0.5 | ○ | — | X |

For Examples 5 to 7, the releasability from the mold was excellent, and the lens sheets had high transparency and further were highly stable over time.

On the other hand, the lens sheet prepared in Comparative Example 10 had poor releasability, could not maintain the transparency in a high-temperature and high-humidity environment and was poor in stability over time. The lens sheet prepared in Comparative Example 11 was highly stable over time in a high-temperature and high-humidity environment but had poor releasability. The lens sheet prepared in Comparative Example 12 was highly stable over time in a high-temperature and high-humidity environment but had an unsatisfactory level of releasability due to short chain length (n=4) of the alkyl group in the phosphoric ester used.

The invention claimed is:

1. A resin composition comprising: an epoxy (meth)acrylate oligomer having an average molecular weight of not more than 1500, a copolymer of a (meth)acrylic ester with styrene or α-methylstyrene, a thermoplastic urethane elastomer, a (meth)acrylic monomer, and a photopolymerization initiator, polyether-modified polydimethylsiloxane as an additive, and, as an internal release agent, a phosphoric ester represented by formula 1 or a phosphoric ester represented by formula 2:

$$HOP(=O)(OC_nH_{2n+1})_2 \qquad (1)$$

wherein n is an integer of 4 or more; and $$HOP(=O)(C_nH_{2n+1})(OC_nH_{2n+1}) \qquad (2)$$

wherein n is an integer of 4 or more.

2. The resin composition according to claim 1, wherein, when the concentration of OH group contained in the resin composition is not less than 1.2 mmol/g, the content of the release agent is 0.5 to 1.0% by weight based on the resin composition.

3. The resin composition according to claim 1, wherein, when the concentration of urethane chain in the thermoplastic urethane elastomer contained in the resin composition is not less than 0.28 mmol/g and the concentration of OH group contained in the resin composition is 0.41 to 1.2 mmol/g, the content of the release agent is 0.1 to 1.0% by weight based on the resin composition.

4. An optical element comprising the resin composition according to any one of claims 1, 2 or 3.

5. The optical element according to claim 4, which has a refractive index of not less than 1.55 at 2° C.

6. The optical element according to claim 4, wherein said optical element is a Fresnel lens.

7. An optical element produced by coating the resin composition according to any one of claims 1, 2 or 3 onto a mold, providing a substrate on the coating, then curing the resin composition, and separating the cured product and the substrate from the mold.

8. The optical element according to claim 5, wherein said optical element is a Fresnel lens.

* * * * *